United States Patent
Taylor-Smith et al.

(10) Patent No.: US 6,187,427 B1
(45) Date of Patent: *Feb. 13, 2001

(54) HYBRID INORGANIC-ORGANIC COMPOSITE FOR USE AS AN INTERLAYER DIELECTRIC

(75) Inventors: Ralph E. Taylor-Smith, Dunnellen; Jorge Luis Valdes, Branchburg, both of NJ (US)

(73) Assignee: Lucent Technologies, Inc., Murray Hill, NJ (US)

(*) Notice: Under 35 U.S.C. 154(b), the term of this patent shall be extended for 0 days.

This patent is subject to a terminal disclaimer.

(21) Appl. No.: 09/276,912

(22) Filed: Mar. 27, 1999

Related U.S. Application Data

(60) Division of application No. 08/911,489, filed on Aug. 14, 1997, now Pat. No. 5,965,202, which is a continuation-in-part of application No. 08/641,856, filed on May 2, 1996, now Pat. No. 5,739,180.

(51) Int. Cl.$^7$ .............................. C08J 9/36; C08K 13/02
(52) U.S. Cl. ...................... 428/305.5; 428/317.9; 521/55; 521/75; 521/92; 521/96; 523/202; 523/203; 523/216
(58) Field of Search ................. 521/55, 75, 92, 521/96; 523/202, 203, 216; 428/305.5, 317.9

(56) References Cited

U.S. PATENT DOCUMENTS

| | | | | |
|---|---|---|---|---|
| 4,980,062 | * | 12/1990 | Block | 210/490 |
| 5,488,015 | * | 1/1996 | Havermann et al. | 437/195 |
| 5,494,858 | * | 2/1996 | Gnade et al. | 437/231 |
| 5,514,734 | * | 5/1996 | Maxfield et al. | 523/204 |
| 5,739,180 | * | 4/1998 | Taylor-Smith | 523/203 |
| 5,965,202 | * | 10/1999 | Taylor-Smith et al. | 427/245 |

OTHER PUBLICATIONS

Miller et al. "Toughened Inorganic–Organic Hybrid Materials for Microelectronics Applications," 1997 Proceedings for the 3rd International Dielectrics for ULSI Multilevel Interconnection Conference (DUMIC), Library of Congress No. 89–644090, pp. 295–302, 1997 No month.*

Hendricks, "Organic Polymers for IC Intermetal Dielectric Applications," v.38(6) Solid State Technology, p. 117ff, Jul. 1995.*

* cited by examiner

Primary Examiner—Blaine Copenheaver
(74) Attorney, Agent, or Firm—DeMont & Breyer, LLC

(57) ABSTRACT

Three-phase composite materials system having a low dielectric constant and physico-chemical properties suitable for IC fabrication conditions, and a method for making such materials, are disclosed. The three-phase composite material includes an organic phase, an inorganic phase and a void phase. The organic phase is in the form of an organic polymer matrix, the void phase is represented by microporosity present in the matrix, and the inorganic phase is implemented as inorganic particles that are coupled, via a coupling agent, to the organic matrix. The low dielectric constant of the composite is attributable to the microporous organic polymer matrix. The inorganic particles are responsible, at least in part, for providing thermal stability and other required physico-chemical properties to the composite.

24 Claims, 2 Drawing Sheets

HYBRID INORGANIC-ORGANIC COMPOSITE FOR USE AS AN INTERLAYER DIELECTRIC

STATEMENT OF RELATED CASES

This application is a division of application Ser. No. 08/911,489, filed on Aug. 14, 1997, now U.S. Pat. No. 5,965,202, which is a continuation-in-part of application number 08/641,856, filed on May 2, 1996, now U.S. Pat. No. 5,739,180.

FIELD OF THE INVENTION

The present invention relates to a materials system for use as an interlayer dielectric.

BACKGROUND OF THE INVENTION

The semiconductor industry is moving toward increasing device complexity, requiring shrinking geometric dimensions and higher component integration with greater densities and more circuit layers. For example, while current generations of integrated circuit devices (ICs) have interconnect line widths down to about 0.35 microns, such line widths are scheduled to decrease to 0.25, 0.18, 0.13, 0.10 and sub 0.10 microns by 1998, 2001, 2004, 2007 and 2010, respectively. See, "The National Technology Roadmap for Semiconductors," Semiconductor Industry Association, pp. 1–3, 1994.

Current generations of ICs rely on silicon dioxide as the interlayer dielectric (ILD). A silicon dioxide-based ILD is usually formed via spin-on glass processes, or more typically from some derivative of plasma or chemical vapor deposition. While suitable for interconnect line widths of about 0.35 microns, the relatively high dielectric constant of silicon dioxide, which is generally in the range of about 3.9 to 5 depending on processing conditions, renders it unsuitable for use as an ILD at the aforementioned smaller line widths. Specifically, with silicon dioxide- based ILDs, capacitance increases to a level such that unacceptable RC (interconnect) delays and increased cross talk result, adversely impacting device speed and degree of power dissipation.

Fluorinated oxides provide an immediate near-term solution for next-generation devices, i.e., 0.25 micron line width. Such fluorinated oxides can be synthesized with dielectric constants in the range of 3.2 to 3.5. See, Laxman, "Low $\epsilon$ Dielectrics: CVD Fluorinated Silicon Oxides," Semiconductor Int'l., p. 71, May 1995.

The aforementioned conventional interlayer dielectric chemistries may, however, be unsuitable for use in devices requiring interconnect line widths of 0.18 microns and less. A shift to new types of insulating materials with sub-3. dielectric constants may be required. To that end, candidate low-dielectric constant organic materials are being developed.

One class of candidate low-dielectric constant organic materials are organic polymers, some of which have a dielectric constant less than 3. Hendricks, "Organic Polymers for IC Intermetal Dielectric Applications," Solid State Tech., July 1995. Incorporating fluorine into such organic polymers is known to further lower the dielectric constant.

Most organic polymers do not, however, possess the physico-chemical properties required for IC applications, particularly thermal stability. Material characteristics required for interconnect technology other than low dielectric constant are well-known and include high thermal stability (sufficient to withstand back-end IC fabrication temperatures within the range of 400–500° C.), relatively high resistance to degradation by, or reaction with, chemicals to which the candidate material will be exposed during device fabrication, low gas permeability and moisture absorption, low coefficient of thermal expansion, high tensile modulus, high etch selectivity and the like. Few organic polymers are stable at temperatures greater than 350° C.; such properties are more typical of oxides and similar inorganics. Hence the current predominant usage of such inorganic materials systems for this application.

Recently, organic-inorganic hybrid systems have been proposed for use as interlayer dielectrics. One such system is Chemat-B by Chemat Technology, Northridge, Calif. The Chemat-B system involves depositing an organic-inorganic material formulation with subsequent thermal decomposition of the organic component, which supposedly yields a microporous inorganic system. The organic constituent is therefore not retained in the final material structure and the ultimate system consists of an inorganic framework with discontinuous dispersed void space resulting from the decomposed organic. Chemat-B is reported to have a sub-3.0 dielectric constant. See, 1997 Proceedings, Dielectrics for ULSI Multilevel Interconnection Conference (DUMIC), Library of Congress No. 89-644090, pp. 93–97, 1997 ISMIC—222D/97/0295.

Miller et al. of IBM have reported on a nanophase-separated inorganic-organic hybrid composition having a sub-3.0 dielectric constant prepared from reactively-functionalized poly(aric esters) and oligomeric silsesquioxanes. See 1997 Proceedings, DUMIC, Library of Congress No. 89-644090, pp. 295–302, 1997 ISMIC—222D/97/0295. Silsequioxanes are organically-modified inorganic glasses having a lower dielectric constant, e.g., in the range of about 2.7–3.2, than conventional inorganic silicate glasses, which have a dielectric constant in the range of about 3.9–5.0. While having an advantageously lower dielectric constant than conventional glasses, such materials typically have poor mechanical properties. In particular, silsequioxanes experience crack formation during processing. Miller et al. address that problem by "rubber-toughening" the virgin silsequioxane material systems by incorporating a small amount, e.g., about 0–20 weight percent, of an organic polymeric substituent such as a polyimide.

The material system of Miller et al. may be characterized as a glassy inorganic material with a minor fraction of included organic. Since the included organic represents a small portion of the composite system, the resultant dielectric constant is controlled by the inorganic matrix, which is the majority phase. As such, it is unlikely that such a system could achieve a dielectric constant much less than that of the dominant inorganic phase, i.e., approximately 3.

Although various systems have been proposed, there remains a need for a material having a suitably low dielectric constant and appropriate physico-chemical properties for use as an interlayer dielectric in future generations of IC devices.

SUMMARY OF THE INVENTION

A hybrid inorganic-organic composite (IOC) materials system useful as an interlayer dielectric having utility in microelectronics, and a method for its synthesis, are disclosed. The present materials system is characterized by a low dielectric constant and as having physico-chemical properties suitable for IC fabrication conditions. Interlayer dielectric materials formed according to the present invention provide advantages over conventional dielectric materials, especially when used to form interconnect lines having sub-0.25 micron interconnect line widths.

The present interlayer dielectric materials system includes an organic phase in the form of a polymer matrix and an inorganic phase linked thereto. The inorganic phase and the organic phase are generated from respective inorganic phase and organic phase precursors. The organic phase is formed in the presence of a microporosity-imparting agent, so that, when formed, the organic phase includes void space or pores. Such pores advantageously lower the dielectric constant of the interlayer dielectric materials system. The present materials system is thus a three-phase system. Additionally, it is preferred that at least one of either the inorganic phase or organic phase contains fluorine, known for reducing the dielectric constant of materials systems.

According to the present method, an interlayer dielectric materials system is formed by coupling the inorganic phase and the organic phase. In a first embodiment, the aforementioned coupling is promoted via the use of a coupling agent. The coupling agent functions as a bridge that links the inorganic and organic phases. The link is formed via a dual-coupling mechanism wherein a group of the coupling agent forms a link with the inorganic phase and another group of the coupling agent forms a link with the organic phase. In a second embodiment, the coupling agent is used to form the inorganic phase, thereby providing the inorganic phase with the group capable of linking with the organic phase. Thus, in the second embodiment, additional coupling agent is not required to couple the inorganic and organic phases.

For use as an interlayer dielectric, the present materials system is deposited on a silicon wafer or other substrate. In its final form, however, the interlayer dielectric, i.e., the hybrid IOC materials sytem, is not amenable to typical deposition methods. It is therefore advantageous to deposit a three-phase composite precursor of the final interlayer dielectric material on a substrate.

In presently preferred embodiments, the present interlayer dielectric materials system is "spun on" to a substrate, etc., using well known spin-coating techniques. In some embodiments, the precursor formulation contains the inorganic phase or a precursor thereof, a coupling agent, a microporosity-imparting agent and the organic component precursor. In some of the aformentioned embodiments, the coupling agent is coupled to the inorganic phase or its precursor before depositing the precursor formulation on a substrate. In other of the aforementioned embodiments, such coupling to the inorganic phase or its precursor is initiated after the formulation has been deposited on a substrate.

After depositing the precursor formulation, additional reactions are initiated to form the final hybrid-IOC material. In particular, the organic phase precursor is polymerized thereby forming the organic matrix to which the inorganic phase is coupled. The organic phase precursor is polymerized only after the precursor formulation is deposited on a substrate. As the organic phase is formed, it becomes microporous through the action of the microporosity-imparting agent.

The present method is quite flexible in terms of the ordering of the synthesis steps. For example, as noted above, the coupling agent may be coupled to the inorganic phase, or its precursor either before or after adding the organic phase precursor and microporosity-generating agent thereto. Additionally, as mentioned above, the coupling agent may be coupled to the inorganic phase either before or after depositing the formulation on to a wafer. Also, the coupling agent may be coupled to the organic phase precursor before it is coupled to the inorganic phase or its precursor. These and other permutations of a method according to the present invention are described in more detail below under the Detailed Description. Notwithstanding the aforementioned flexibility, and regardless of other reactions and associations taking place, the organic phase precursor remains substantially unpolymerized until after the precursor formulation is deposited on a substrate.

BRIEF DESCRIPTION OF THE DRAWING

Further features of the invention will become more apparent from the following detailed description of specific embodiments thereof when read in conjunction with the accompanying Figures in which.

DETAILED DESCRIPTION

Figure 1:
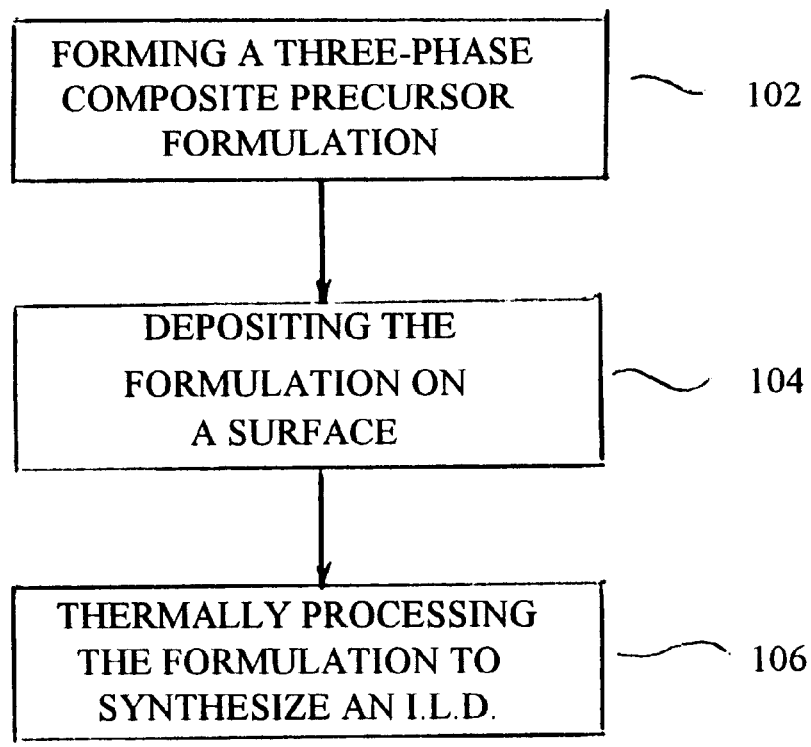
FIG. 1 is a flow diagram of a method according to the present invention for forming an interlayer dielectric material.

The present invention is directed toward materials useful as an interlayer dielectric having utility in microelectronics applications, and a method for their synthesis. Such materials are formable to have a dielectric constant less than 3, and to possess the physico-chemical properties required for an interlayer dielectric. Regarding such properties, an interlayer dielectric should have thermal stability to at least about 450° C.; relatively high resistance to degradation by, or reaction with, chemicals to which the candidate material will be exposed during device fabrication, low gas permeability; low moisture adsorption; low coefficient of thermal expansion; high tensile modulus; high etch selectivity and the like. See Murarka, "Low Dielectric Constant Materials for Interlayer Dielectric Applications," Solid State Tech., pp. 83–90, March 1996; Singer, "Low k Dielectrics: The Search Continues," Semiconductor Int'l., pp. 88–96, May 1996. Those articles, and all other articles, patents and patent applications cited in this specification are incorporated herein by reference.

Interlayer dielectrics according to the present invention are microporous, hybrid IOC materials. Such materials are formed from preferably fluorinated inorganic and/or organic precursors and possess sufficient microporosity, as required, to achieve a dielectric constant of less than about 3. The hybrid IOC materials of the present invention contain an inorganic component linked to an organic matrix. Such composites possess properties of both the inorganic component and the organic component.

Including the inorganic component in the present composites advantageously imparts properties characteristic of the inorganic, e.g., thermoresistance, permeation resistance, and the like, to the present interlayer dielectric. The organic polymeric component is characterized by a low dielectric constant, typically in the range of 2 to 3. The benefits of the inherently low-dielectric characteristics of the organic polymeric component are offset, however, by the comparatively higher dielectric attributes of the inorganic component.

In order to compensate for such higher dielectric attributes, hybrid IOCs according to the present invention are microporous. Microporosity provides such compensation because air, which has a much lower dielectric constant than that of the inorganic or organic components, is retained within pores. Since the dielectric properties of the complete hybrid IOC are averaged over its constituent parts, the presence of air lowers average dielectric attributes. Additionally, the inorganic component or the organic component, or more preferably, both, contain fluorine. As is known in the art, fluorine reduces the dielectric constant of systems associated therewith. Thus, the present interlayer dielectrics are characterized by three phases; an inorganic phase, an organic phase and a void phase.

It should be noted that the phrases "inorganic component," "inorganic phase" and "inorganic particles" are used interchangably herein. As described in more detail below, the inorganic component, etc., is generated, typically via oligomerization, from a precursor component (or phase or particle) that has an inorganic constituent but which may not be purely "inorganic." That is, the inorganic component precursor may include an organic constituent, as well. Similarly, the phrases "organic phase," "organic component" and "organic matrix" are used interchangably. The organic component, etc., is generated, typically via polymerization, from an organic component (or phase) precursor. The terms "phase," "component" or "particles" will be used to refer to both the component and its precursor unless otherwise noted. Moreover, when referring to the present invention, the terms "interlayer dielectric" and "hybrid IOC" are synonomous.

As noted under the Summary of the Invention, steps in a method for fabricating the present interlayer dielectric materials should be considered to be arbitrarily ordered and substantially permutable. That is, they may carried out in a different order, unless noted to the contrary. One notable exception, previously mentioned, is that the organic component precursor is polymerized to form the organic component after it is deposited on a substrate. Once the organic component is formed, the materials composition is not spinnable.

Figure 3:
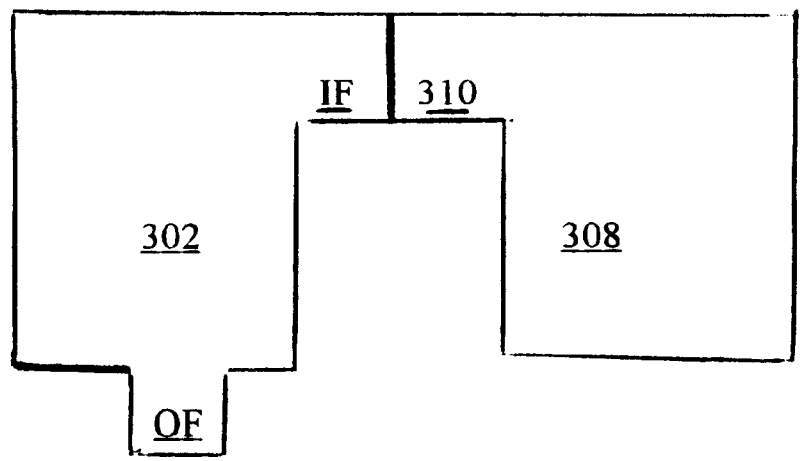
FIG. 3 is a schematic illustration of a first embodiment of an inorganic component possessing an organic finctionality.
Figure 4:
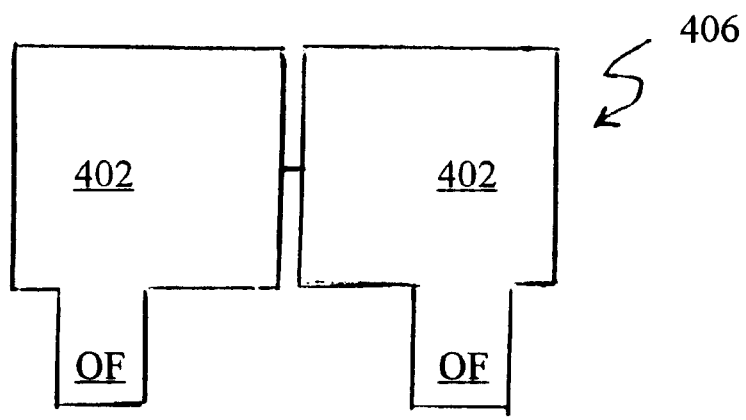
FIG. 4 is a schematic illustration of a second embodiment of an inorganic component possessing an organic functionality.

FIG. 1 shows an exemplary embodiment of a method according to the present invention. Described in terms of its constituent operations, the present method includes a first operation 102 of forming a three-phase composite precursor formulation, a second operation 104 of depositing the precursor formulation onto a substrate, and a third operation 106 of reacting the deposited formulation to synthesize the present interlayer dielectric. Those three operations are described in detail below in conjunction with FIGS. 2–4.

Figure 2:
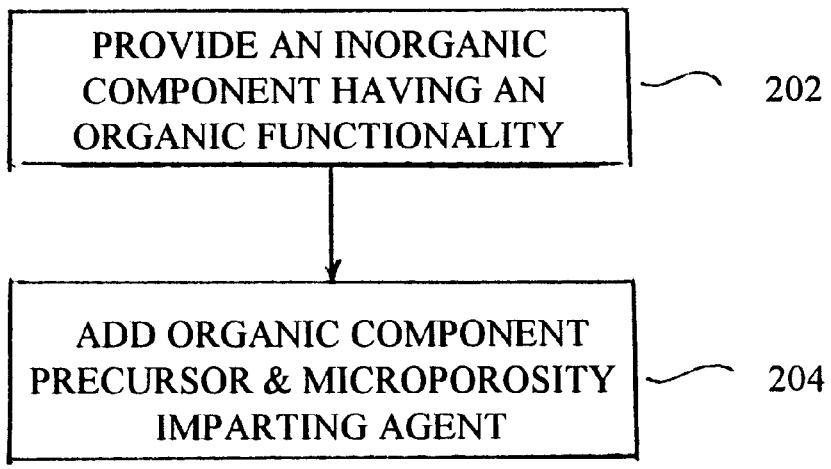
FIG. 2 is a flow diagram showing an exemplary embodiment of a method for forming a spimlable precursor formulation.

FIG. 2 shows an exemplary embodiment of a method for forming the three-phase composite precursor formulation, i.e., operation 102 of FIG. 1. As indicated in operation block 202, an inorganic component, i.e., a precursor or the component, having an organic functionality OF is provided. As described later in this specification, the organic functionality OF will be used to couple the inorganic component to the organic component.

The inorganic component containing the organic functionality OF is prepared, in a first embodiment, by linking the inorganic component with a coupling agent possessing the organic functionality OF. Such a link is illustrated conceptually in FIG. 3. The coupling agent 302, which possesses the organic functionality OF and also possesses an inorganic functionality IF, is linked to inorganic component 308. The link is established via a preferential interaction between the inorganic functionality IF present in the coupling agent and a functional group or groups 310 present in the inorganic component 308.

Before describing additional steps in the formation of the precursor formulation, further description of the nature of the inorganic precursor, inorganic component and the coupling agent is provided.

In presently preferred embodiments, the inorganic component used for forming the present compositions are synthesized from an inorganic component precursor. The inorganic component precursor is an organometallic compound, typically a metal alkoxide. Metal alkoxide can be represented by the formula $M(OR)_4$:

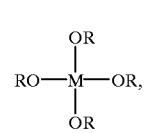

[1]

where: —OR is an alkoxide group, which can be individually selected, and M is a metal, preferably germanium (Ge), titanium (Ti), zirconium (Zr) or tin (Sn) and more preferably silicon (Si).

Several non-limiting examples of such metal alkoxides include tetraethyl orthosilicate (TEOS), tetramethyl orthosilicate (TMOS), zirconium (IV) butoxide and zirconium (IV) propoxide. There are no per se limitations on the size of alkyl group R. As the size of R increases, however, the rate at which the inorganic component is formed via loss of the —OR groups decreases. As a practical matter, smaller sized alkyl groups are preferred. Metal alkoxides suitable for use in conjunction with the present invention can be purchased from a manufacturer, such as Gelest, Inc., of Tullytown, Pa. Alternatively, the metal alkoxide can be synthesized according to well known methods.

In other embodiments, modified-metal alkoxides can be used as a precursor. In such modified-metal alkoxides, less than all, and preferably one, of the —OR groups of the metal alkoxile are replaced by an —$R^1$ group, i.e., $R^1{}_nM(OR)_{4-n}$. During synthesis of the inorganic component, alkoxide groups, i.e., -OR, are driven off as volatile byproduct that is not retained in the final inorganic component. The substituted group, i.e., the -$R^1$ group, however, is retained in the final inorganic component. The -$R^1$ group is an organic group, i.e., carbon containing, that may be polymerizable or non-polymerizable. Note that even though the reaction product from the modified-metal alkoxide $R^1{}_nM(OR)_{4-n}$ is not properly categorized as "inorganic," the sol-gel reaction product with the retained -$R^1$ will still be referred to as the inorganic component, etc. Methyltriethoxysilane (MTEOS) is an example of such a modified alkoxide. See Brinker et al., *Sol-Gel Science: The Physics and Chemistry of Sol-Gel Processing*, p. 115, (Academic Press, Calif. 1990).

Advantageously, one or more of the -OR groups of the metal alkoxide is replaced with a fluorine-containing -$R^1$ group. A nonlimiting example of a compound resulting from such substitution is (tridecafluoro-1,1,2,2-tetra-hydrooctyl) triethoxysilane:

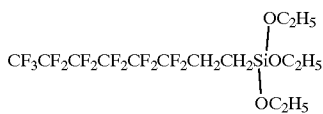

Such fluorine-containing metal alkoxides are available from Gelest, Inc., of Tullytown, Pa.

As previously described, the inorganic component has a dielectric constant-raising effect on composites according to the present invention. Thus, it is desirable to limit the concentration of the inorganic component in the composite to the amount required for imparting the desired characteristic attributes, i.e, thermal resistance and the like. It will be appreciated that such a concentration will vary with the organic component selected, since a given organic component will contribute its own characteristic attributes to the composite. As such, the concentration of the Inorganic component is best determined by routine experimentation as is within the capabilities of those having ordinary skill in the art.

In general, however, the inorganic component may be present in the hybrid inorganic organic composite in an amount in the range of from about 1 to 50 weight percent based the combined weight of the inorganic and the organic component. In other words, at a maximum, the inorganic component can be present in about a 1:1 ratio with the organic component. More preferably, the inorganic component is present in a concentration less than about 30 weight percent based on the combined weight of the inorganic and the organic component. Thus, the inorganic component precursor is provided in an amount within the ranges stated above.

The inorganic component is generated in-situ from the inorganic component precursor via controlled nucleation and growth methods. The inorganic component is formed in two steps that occur simultaneously after initialization. The first step is monomer formation via partial hydrolysis of the inorganic component precursor, which is typically the metal or modified-metal alkoxide, e.g.:

$$R^1_n M(OR)_{4-n} + H_2O \longrightarrow R^1_n(RO)_{4-n-1}MOH + ROH \quad [2]$$

Solvent and catalyst can be used to promote the reaction. The second step is polycondensation of the monomers to form colloid-like oligomers:

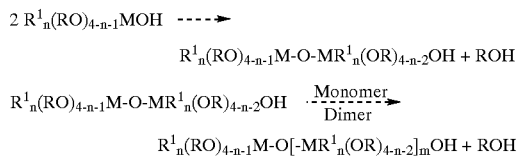

Thus, the inorganic component "grows" via a controlled polymerization. Though only figuratively accurate, it is convenient to refer to the inorganic component as a collection of "particles." The inorganic particles are perhaps best described as regions of relatively uniform density that are rich in the inorganic component. The polymerization can be controlled to yield particles having a specific molecular weight, i.e., size. The particles forming the colloid are, on average, nanometer (nm)-sized. That is, the particles have an average particle size of less than a micron in diameter, and are preferably less than 400 nm in diameter. The formation of such nanometer-sized in-situ-generated inorganic particles is well known in the art. See, for example, Yoshila, A., "Silica Nucleation, Polymerization and Growth Preparation of Mono-Disperse Sols," in *The Colloidal Chemistry of Silica*, Bergna H. E., ed., Adv. Chem. Ser. 234, ACS, Wash. D.C. (1990); Gelest Catalog for Silicon, Germanium, Tin and Lead Compounds, Metal Alkoxides, Diketonates and Carboxylates, pp. 279–283 (1995). Those skilled in the art will recognize that the chemistry described above applies well known sol-gel techniques.

Though less preferred, a suspension of preformed nanometer-sized (average) inorganic particles can be used as an alternative to generating the inorganic particles in-situ as described above. Using such preformed particles is less preferred because during conventional blending, i.e., melt blending, particle agglomeration typically results. Such agglomeration may lead to poor mechanical properties if the size-scale of heterogeneity is sufficiently high.

Most multi-component systems suffer failure at the component interface. Thus, it is desirable to increase inter-component adhesion in some manner. This is the function served by the coupling agent. It was previously noted that the coupling agent acts as a bridge to link the inorganic component to the organic component by forming associations with each. The coupling agent may alternatively be conceptualized as generating an "interphase region." Such an architecture should enhance the mechanical properties of the hybrid IOC-based interlayer dielectric by facilitating inter-component stress transfer. Using a coupling agent also reduces inorganic phase agglomeration and phase separation. Furthermore, it has been observed that the coupling agent can result in enhanced thermal resistance.

Joining the inorganic and organic components to the coupling agent has been described, alternatively, as linking, coupling, and associating. The interaction between the organic and inorganic functionalities OF, IF of the coupling agent with the groups present in the organic and inorganic components, e.g., group 310 of the inorganic component, is believed to be a covalent bond-forming reaction. Those having ordinary skill in the art will be able to select a suitable coupling agent based on the inorganic and organic components being used.

For example, if the organic component precursor is a polyimide precursor and the morganic component precursor is (tridecafluoro-1,1,2,2-tetra- hydrooctyl)triethoxysilane are used, a suitable coupling agent contains a primary amine functionality, e.g., R—$NH_2$, and Si—O—R groups. The amine functional group reacts with the polyimide precursor forming a polyamic acid amide linkage before imidization of the precursor. The Si—O—R groups, where R is any non-polmerizable alkyl group, such as, without limitation, a methyl or an ethyl group, react with the silanol (Si—O—H) groups resulting from (tridecafluoro-1,1,2,2-tetra-hydrooctyl)triethoxysilane hydrolysis. Preferably, the coupling agent contains at least two —OR groups bound to a single metal atom, e.g., silicon for the above example. Given the above organic and inorganic components, suitable exemplary coupling agents include, without limitation, 3-aminiopropyltriethoxysilane, 3-aminopropyltrimethoxysilane, 3-aminopropyltris(methoxyethoxy-ethoxy)silane, 3-aminopropyltris(trimethylsiloxy)-silane. In preferred embodiments, the aforementioned coupling agents are fluorine-substituted.

The aforementioned exemplary coupling agents have only a single primary amine group, and will function as a chain terminator, limiting the chain length of the organic component grafted onto the inorganic component. In preferred embodiments, the coupling agent has two primary amine groups so that it will function as a chain extender. Coupling agents having two such primary amine groups, however, are not readily commercially available. Such coupling agents can, however, be synthesized. See, for example, Morikawa et al., "Preparation of New Polyimide-Silica Hybrid Materials via the Sol-Gel Process," J. Mater. Chem., V.2, no. 7, pp. 670–90 (1992).

It will be appreciated by those skilled in the art that the R group of the inorganic functionality IF of the coupling agent will affect the rate and extent of the reaction between the coupling agent and the inorganic component. Furthermore, it should be understood that in preferred embodiments, the coupling agent and the inorganic compound contain the same metal. Coupling agents can be obtained from manufacturers such as Gelest. Inc. of Tullytown, Pa. See, for example, Gelest Catalog for Silicon, Germanium, Tin and Lead Compounds, Metal Alkcoxides, Diketonates and Carboxylates, pp. 41–52 (1995).

The coupling agent should be added to the inorganic component in an amount sufficient to bond to some portion of accessible M—O—H groups of the inorganic particles. The amount of accessible M—O—H groups is estimated by calculating a total number of surface M—O—H groups based on average particle size. A theoretical coupling agent requirement is then estimated based on the number of such surface M—O—H groups. An excess of two to three times the theoretical requirement may suitably be added to the inorganic component.

It should be appreciated that the theoretical coupling agent requirement may vary with the particular inorganic compound selected and its concentration. Coupling agent requirements are best determined, however, by routine experimentation. A figure of about 0.3 has been found to be satisfactory for the molar ratio of (the coupling agent): (the metal in the organic compound precursor) for the system described in the Example later in this specification. It is expected, however, that lesser amounts of coupling agent may suitably be used. For example, it is believed that bonding a minor portion, i.e., less than 50 percent, of accessible M—O—H groups is acceptable if the minor portion is well distributed about the "perimeter" of the particle.

In certain embodiments, the coupling agent oligomerizes. Conditions are selected to reduce oligomerization to promote efficient use of materials. For example, reducing coupling agent (concentration reduces oligomerization. Such conditions are known to those skilled in the art. See Keefer, K. D., in *Silicon-Based Polymer Science*, ACS Symp. Ser., v. 224 (1990).

It will be appreciated by those skilled in the art that the aforementioned coupling agents are modified-metal alkoxides having at least one $-R^1$ group that can participate in organic polymerization reactions. As previously described, such modified-metal alkoxides are also suitable for forming the inorganic component. Hence, in a second embodiment illustrated conceptually in FIG. 4, an inorganic component 406 having the organic functionality OF (required in block 202 of FIG. 2) is generated from a coupling agent 402 containing the organic finctionality OF. In such embodiments, the coupling agent serves as the inorganic component precursor, and the previously-described ranges for the inorganic component precursor concentration apply. Again, the organic functionality OF of the coupling agent is selected based on the organic component precursor.

In embodiments in which the coupling agent is the inorganic component precursor, it is not necessary to include additional coupling agent to graft the coupling agent-based inorganic component to the organic component since the organic functional group from the coupling agent is retained in the inorganic component formed therefrom. It should be understood that the coupling agent is preferably fluorine substituted if the organic component precursor does not contain fluorine.

With continuing reference to operation 202 of FIG. 2 (providing an inorganic component having an organic functionality as a step in forming a three-phase composite precursor formulation), linking the inorganic component to the coupling agent is not required at this point in the method. In other words, operation 202 is to be understood to require providing, as a minimum, the constituents required for synthesizing an inorganic component having an organic functionality.

In operation 204, an organic component precursor and microporosity-imparting agent are added to the constituents required by operation 202. It should be understood that the order of operations 202 and 204 are reversible; the inorganic component can be formed with the organic compound precursor and the microporosity-imparting agent present.

Thus, by operations 202 and 204, a three-phase composite precursor formulation is formed. The formulation is referred to as a "precursor" formulation, since, at this point in the method, the organic matrix is not fully developed, but is present in the form of the organic component precursor. Likewise, the third phase, which is the void phase, i.e, the microporosity generated within the organic matrix, is also not yet developed.

It was indicated above that the order in which various linking and reaction steps are carried out is substantially freely permutable. As such, it should be appreciated that with such permutations, the composition of the three-phase composite precursor formulation changes. For example, in one embodiment, the formulation includes an inorganic component precursor, an unlinked coupling agent, an organic component precursor and a micro-porosity imparting agent. In a second embodiment, the formulation includes an inorganic component that has been synthesized from the inorganic component precursor. In a third embodiment, the inorganic component has been linked to the coupling agent. In a fourth embodiment, the coupling agent is linked to the organic component precursor before it is linked to the inorganic component. In a fifth embodiment, the coupling agent is itself the inorganic component precursor so additional coupling agent is not required beyond that required for synthesizing the inorganic component.

As previously described, it is advantageous for an interlayer dielectric material according to the present invention to contain only that amount of the inorganic component that is required to impart the desired physico-chemical properties. Increasing the concentration of the inorganic component beyond that amount disadvantageously and unnecessarily increases the dielectric attributes of the interlayer dielectric. Thus, it is preferable to select an organic precursor that is known to produce a polymer possessing a greater measure of thermal stability and other desired physico-chemical properties. Such preferred precursors include, without limitation, those that form ring-containing polymers, either aliphatic or aromatic rings. In a particularly preferred embodiment, the organic component is an aromatic polyimide. As is known to those skilled in the art, aromatic polyimides can be synthesized by the reactions of dianhydrides with diamines or diisocyanates. See, Odian, *Principles of Polymerization*, (John Wiley & Sons, 3d. ed.). Once an organic component precursor is selected, a parametric study is preferably undertaken wherein various hybrid IOCs are formed using the selected precursor and various levels of a selected inorganic component. The thermogravimetric properties, the coefficient of thermal expansion and other physical proper ties of the various samples are measured. A hybrid IOC for use as an interlayer dielectric is then suitably selected based on its dielectric constant and physico-chemical properties.

Returning to FIG. 1, in operation block 104, the three-phase composite precursor formulation is deposited as a layer having a suitable thickness and appropriate gap-fill and step-coverage characteristics on a surface, such as a silicon wafer. In presently preferred embodiments, the formulation is deposited by spin-coating. In other embodiments, derivatives of plasma or chemical vapor deposition may suitably be used. Optional formulation additives, such as, without limitation, a viscosity modifier, can be mixed into formulation near to the time of deposition. Viscosity modifiers can be used to reduce or increase formulation viscosity, if necessary. If formulation viscosity is too high, for example, it is difficult to obtain a uniform film. Volatile solvents, among other modifiers, can be used to lower the formulation viscosity for spin coating. Such volatile solvents evaporate during spin coating and from the deposited film thereafter. The spin-coating formulation can be from low molecular weight monomers, as in Examples I–III presented later in this specification, from oligomer/pre-polymer mixtures, or from solution wherein the formulation is "dissolved" in "solvent."

For future generation devices having 0.25 micron line width and less, the precursor is deposited so as to yield a film thickness of a 1 micron or less. Moreover, the precursor formulation should possess characteristics enabling optimal gap-fill and step-coverage. Selection of appropriate spin-deposition process conditions, e.g., spin-rate, spin-time; deposition temperature; formulation viscosity and the like, for achieving such characteristics are within the capabilities of those having ordinary skill in the art.

In block 106, after the three-phase composite precursor formulation is deposited on a wafer or the like, it is thermally processed. Thermal processing volatizes evaporates any solvent or dispersing fluid, in addition to promoting chemical reaction to convert the deposited precursor formulation to its ultimate chemical and physical state. In particular, the organic component precursor is polymerized forming the organic matrix, and the inorganic component is linked thereto. Thermal processing can be performed in air, or, alternatively, under nitrogen atmosphere to minimize the possibility of oxidative degradation. Anticipated processing conditions for a spun-on polyimide-based system according to the present invention includes a 15 minute bake at 250° C. and a 1.5 hour ramp up to 400°.

The microporosity-imparting agent is either reacted or incorporated within the polymerizing organic phase precursor, depending on the nature of the agent, generating void space. In particular, microporosity is imparted, in a first embodiment, by using foaming agents, in a second embodiment using thermally labile constituents, and in a third embodiment by incorporating molecules exhibiting porous caged-structure such as Buckminster fullerenes or zeolites. A description of the aforementioned microporosity-imparting agents follow.

Regarding the first embodiment, foaming agents undergo chemical reaction forming volatile gases above a known, definite temperature. In the present method, the foaming agent undergoes chemical reaction during polymerization of the organic precursors. The subsequent liquid-to-gas expansion and gaseous evolution from the system caused by the foaming agent generates void space or porosity within the surrounding organic matrix.

The size and number of pores, i.e., pore density, and degree of pore continuity or interconnectivity can be empirically controlled by regulating the matrix composition and viscosity, the concentration and particle size of the gas-generating material, and the thermal processing history utilized.

As to concentration, higher concentrations of the foaming agent will increase the concentration of pores/void space. Regarding particle size, the foaming agent is typically supplied as a granular solid powder, and particle size affects the number and the size of the pores generated. Particle size affects the number of pores created since gas is evolved from each particle of the foaming agent. If the particles are smaller, then there will be more of such particles at a given concentration of foaming agent. Consequently, more pores are generated. Pore size is controlled by the volume of gas liberated, which is proportional to particle size. Thus, while decreasing particle size for a fixed amount of foaming agent increases the number of pores, it decreases the average pore size.

As noted above, the specifics of the thermal processing cycle also affects the degree of porosity; however, that relationship is complicated and more readily studied via empirical analysis. In principle, higher temperatures should increase porosity due to decreased viscosity. Since, however, the organic matrix will undergo thermally-driven cure which raises viscosity, the overall effect on porosity is difficult to predict a priori.

Exemplary suitable foaming agents include, without limitation, various oxides, peroxides, halides, hydrates, carbonates, sulfates, sulfides, nitrides and nitrates, and compounds of certain elements such as $Al_2(SO_4)_3$, $Co_3O_4$, $PbCl_2$, $CuO$, $Mn_2O_3$, $WO_3$, $BaO_2$, and the like. Preferably, the foaming agent is $IBr$, $InCl_3$, $Fe_2Br_6$ and $MnCl_2$ or other like compounds that are active at temperatures below about 350° C. Regarding the second embodiment, a thermally-labile constituent is homogenously dispersed in, and reacts with, the organic component precursor. The constituent is itself a precursor that generates polymeric materials that react with the organic component forming regions locally-rich in the generated polymeric material. Such polymers readily depolymerize or "chain-unzip" reforming the corresponding monomers/chain fragments at temperatures above the ceiling temperature, $t_c$, defined as the temperature at which the polymerization reaction becomes reversible. Such depolymerization causes voids or porosity in the organic matrix. It will be appreciated that the ceiling temperature of the polymer formed from the thermally-labile component must be lower than the temperature at which the other components, i.e., the inorganic particles, coupling agent, or polymer matrix, will suffer deleterious effects.

Thermally-labile constituents and systems are well understood by those skilled in the art, and include, without limitation, poly(methylmethacrylate) for which $t_c=220°$ C.; poly($\alpha$-methyl styrene) for which $t_c=61°$ C.; and poly (isobutylene) for which $t_c=50°$ C.

In the third embodiment, a molecule exhibiting a porous caged-structure, such as a Buckminster fullerene, or a zeolite, can be incorporated into the interlayer dielectric material. Due to their caged-structure, such molecules will impart a porous microstructure to the interlayer dielectric. Unlike the previous two embodiments wherein the thermally labile constituent or foaming agent leave voids in the material, the selected molecule will remain in the interlayer dielectric. As such, it may be derivatized with a functional group capable of chemically reacting with the functional group in the organic compound. Methods for derivatizing such systems are well known to those skilled in the art. See, Diederich & Thilgen, "Covalent Fullerene Chemistry," Science, v. 271, p. 317 (1996); Dresselhaus et al., *Science of Fullerenes and Carbon Nanotubes,* Academic Press (1996). Zeolites suitable for use in conjunction with the present invention have a pore size of less than about 12–13 angstroms, which includes most if not all zeolites. See, Breck, *Zeolite Molecular Sieves,* (Krieger Publishing Co., 1984 reprint).

It is known that a serious drawback of the sol-gel methodology is drying shrinkage. Drying shrinkage occurs as cosolvents and reaction byproducts are removed from the sol-gel solution. Shrinkage causes cracks in the material. Such shrinkage can be avoided if all the initial components and byproducts can be incorporated directly into the resulting polymer. Thus, in a preferred embodiment, a means for reducing drying shrinkage is added. Such means can be a polymerizable solvent. Preferably, the polymerizable solvent is the organic component precursor itself. Hydroxyterminated monomers can be suitable for this purpose. See, Novak et al., "Simultaneous Interpenetrating Networks of Inorganic Glasses and Organic Polymers: New Routes into Nonshrinking Sol-Gel Derived Composites," Polym. Prep., v.31, pp. 698–99 (1990); Ellsworth et al., "Mutually Interpenetrating Inorganic-Organic Network: New Routes into Nonshrinking Sol-Gel Composite Materials," J. Am. Chem. Soc., v. 113, pp. 2756–58 (1991).

In preferred embodiments, the organic component-forming polymerization reaction is initiated by a free-radical initiator. In a further preferred embodiment, an organic phase cross-linking agent is added as well. The free-radical initiator and the cross linker are selected based on the organic precursor being used. Such selection is within the capabilities of those skilled in the art. Free-radical initiator and cross linker requirements based on organic precursor feed is in the range of from about 1 to about 5 weight percent.

In the following non-limiting examples, the foregoing method is applied to generate three-phase composite precursor formulations that can be spin-coated and polymerized to form materials suitable for use as interlayer dielectrics. It will be appreciated that other inorganic and organic precursor components can be utilized in conjunction with the present method for generating three-phase hybrid IOCs suitable as interlayer dielectric materials.

EXAMPLE I

FORMING A THREE-PHASE COMPOSITE PRECURSOR FORMULATION

EMBODIMENT 1

A hybrid IOC system according to the present invention having a three-phase microstructure was formed from silica as the inorganic component and 2-hydroxyethyl metha (rylate as the organic component as follows. The inorganic component was generated from sodium metasilicate, an inexpensive, commercially available precursor, as described below. 17 grains of solium metasilicate was dissolved at ambient temperature (about 25° C.) in 0.1 liters of de-ionized water. A solution of 3.0 M HCL was prepared and 0.1 liters of such solution was transferred to a 500 cm$^3$ 3-neck flask and permitted to equilibrate at 0° C. in an ice-bath. Purified nitrogen was bubbled through the HCL solution for approximately 10 minutes. The sodium metasilicate solution was then added dropwise to the HCL solution with continuous mixing. After complete addition of the sodium metasilicate solution, the resulting solution was left to stir for three hours. The flask was then removed from the ice-bath, 60.0 g. of NaCl, 0.02 liters of NaOH md 0.16 liters of tetrahydrofuran (THF) were added and the system was stirred vigorously for one hour. The resulting suspension was filtered, and the filtrate was collected and transferred to a 0.5 liter separatory funnel. The aqueous layer was separated and discarded while the organic layer containing synthesized particulate silica, i.e., oligomers of poly(silicic acid), was collected. Purified nitrogen was bubbled through the solution.

The molecular weight of the poly(silicic acid) obtained is controlled by the reaction time arid temperature. Experimental conditions for obtaining specific molecular weights are known to those skilled in the art. See, Abe et al., "Preparation of Polysiloxanes from Silicic Acid III: Preparation and Properties of Polysilicic Acid Butyl Esters," J. Polymer Sci., 21(41), 1983; Ellsworth et al., "Inverse Organic-Inorganic Composite Materials 3: High Glass Content Non-Shrinking Sol-Gel Composites via Poly(silicic) acid esters," Chem. Mater., vol. 5, p. 839, (1993); Yoshida, A., "Silica Nucleation, Polymerization and Growth Preparation of Mono-Dispersed Sols," *The Colloidal Chemistry of Silica,* Bergna, H. E., ed., Adv. Chem. Ser. 234, ACS, Wash. D.C. (1990).

As discussed in more detail below, a methacrylate monomer, specifically 2-hydroxyethylmethacrylate, was used as the organic component precursor for forming the organic component. As such, a coupling agent having vinyl functional groups to react with the vinyl functional group in the methacrylate monomer and having alkoxysilane groups to react with the silanols of the poly(silicic acid) was selected. Methacryloxypropylmethyl-dimethoxysilane, which possesses such functional groups, was selected as a coupling agent. 0.01 liters of coupling agent and 0.01 liters of 3.0 M HCL were added to the colloidal silica solution. The system was stirred continuously for two hours at 25° C. Those conditions were selected to minimize oligomerization of the coupling agent. Next, 50 g. of NaCl and 0.1 liter of de-ionized water were added. The resulting solution was stirred for an hour and then filtered. The filtrate was transferred to a separatory funnel and the organic portion recovered. 30.0 g. of anhydrous sodium sulfate was added, stirred for four hours, and then removed via filtration. 8.36 g. of 2-hydroxyethyl methacrylate monomer was added to the organic portion to obtain a material ultimately incorporating organic and inorganic material in a 1:1 ratio on a weight basis. As previously described, lesser amounts of the inorganic component, such as between 1–30 weight percent may suitably be added to moderate the dielectric attributes incorporated into the resulting IOC. It should be understood that the organic monomer was not polymerized at this time. Polymerization is initiated only after depositing the formulation onto an intended surface, e.g., silicon wafer, etc., in a later step.

Purified hydrogen was bubbled through the solution to promote free-radical inhibition, minimizing organic-phase polymerization. The system was then heated via immersion in a water bath that was maintained at 80° C. Heating continued until approximately 0.01 liters of liquid (the solvent) was distilled off and collected. The residue was recovered and 0.17 g. each, i.e., 2 weight percent based on the monomer added, of a free radical inhibitor (benzoyl peroxide), and a trifunctional acrylate cross linker (2-ethyl-2-hydroxymethyl-1,2 propandiol triacrylate) were added. Residual THF was removed via a rotary evaporator.

A microporosity-imparting agent was added to the formulation and evenly dispersed. The agent was a monomer which, on polymerization, forms regions within the composite structure that are locally rich in a thermally-labile organic polymeric component. The thermally-labile constituent within these regions is then depolymerized or "chain-unzipped" via a thermally-initiated chemical-decomposition reaction, which takes place during monomer polymerization to form the organic matrix. The decomposition reaction generates voids in the materials architecture where such decomposition occurs.

The microporosity-imparting monomer used was a-methyl styrene monomer. The corresponding polymer generated from this monomer readily undergoes depolymerization at temperatures above about 61° C. The a-methyl styrene monomer was added in an amount equivalent to five percent by weight with respect to the organic component precursor. Of course, other monomers may suitably be used to generate other thermally-labile components.

EXAMPLE II

FORMING A THREE-PHASE COMPOSITE PRECURSOR FORMULATION

EMBODIMENT 2

The same inorganic component and organic component are used as in Example I, but the micioporosity-imparting agent is different. In particular, microporosity is to be imparted in the present example via a "foaming agent," which, as the term is used herein, is a compound that undergoes thermally-initiated chemical reaction to form volatile gas. A subsequent material expansion and gaseous evolution occurs generating a "foaming" effect within the material superstructure that forms void space or microporosity. In the present example, IBr is used as the foaming agent. Two percent by weight of the foaming agent, with respect to the organic precursor, is added to the formulation in powder form (ave. particle size ca. 2 microns) and everdy dispersed.

EXAMPLE III

FORMING A THREE-PHASE COMPOSITE PRECURSOR FORMULATION

EMBODIMENT 3

The same inorganic component and organic component are used as in Examples I & II, but the microporosity-imparting agent is different. Specifically, microporosity is obtained by incorporating molecules having caged, porous structures. Accordingly, pore size of the resulting hybrid IOC is controlled directly via the pore size of the incorporated molecular constituent. In the present example, commercially-available Buckminsterfullerene C-60 (powder form), available from Aldrich Chemical Co., is added to the formulation and evenly dispersed. Two percent by weight of the Buckminsterfullerene, with respect to the monomer, is added.

The three-phase composite precursor formulations generated in Examples I, II and III may then be deposited, such as by spin-coating, onto silicon wafers containing a layer of thermal oxide. The precursor formulation obtained in Example I was spin coated on to a wafer at a spin rate in the range of about 2200 to 3000 rpm for 20 seconds at 25° C. Those conditions are suitable for obtaining an average nominal deposited film thickness of less than about 1.5 microns. As previously noted, a thinner film, i.e., about 1 micron or less, should be used if the interlayer dielectric is to be patterned in 0.25 micron or less line-widths. The deposited material is then subjected to thermal processing in order to polymerize the organic matrix phase and generate the final three-phase composite microstructure.

For the systems described in Examples I, II and III, organic polymerization can be initiated by thermal treatment under nitrogen in an oven at 60° C. for eight hours. The system is then exposed to thermal treatment at higher temperature, e.g., greater than 180° C. for 10 minutes and then held at 120° C. under vacuum for 12 more hours. It should be understood that the aforementioned treatment times can be reduced significantly by increasing processing temperature and/or utilizing a partially-reacted organic precursor, e.g., an oligomer.

The 2-hydroxyethyl methacrylate monomer used in the Examples forms a polymer having a relatively high dielectric constant. Other monomers capable of producing an organic material exhibiting a lower dielectric constant, higher glass transistion temperature and greater thermal stability than 2-hydroxyethyl methacrylate monomer are presently preferred for forming threephase precursor formulations according to the present invention. Such preferred formulations are more suitable for use in forming ILDs to be utilized in future-generation microelectronic devices. Preferred formulations utilize, for example, monomer systems suitable for forming aromatic polyimides. Such monomer systems include pyromellitic anhydride with p-phenylene diamine or fluorinated analogs of these molecules. Additionally, other systems having aromatic structures and/or fluorinated groups situated in the polymer repeat-unit (either the main/backbone chain or side-group) should also result in high stability, low dielectric constant materials.

Interlayer dielectric material formed according to the present invention is suitable for use in future-generation microelectronics devices, such as, for example, logic devices, memory devices and the like. It is expected that standard procedures for forming such devices can be used. See, for example, Wolf and Tauber, *Silicon Processing for the VLSI Era,* vol. 1–3, (Lattice Press, 1990). As such, the three-phase composite materials systems disclosed herein will be subjected to various operations during device manufacture, particularly for multi-layer applications. Such operations include planarization, e.g., "dry-etch" plasma processing or chemical/mechanical polishing; etching; patterning, e.g., reactive-ion-etching; metallization, e.g., CVD metal deposition; and thermal processing operations, e.g., post-etch annealing, chip bonding/packaging.

Although specific embodiments of this invention have been described herein, it is to be understood that these embodiments are merely illustrative of the principles of this invention. Numerous and varied modifications may occur to, and be implemented by, those of ordinary skill in the art in view of the present teachings without departing from the scope and the spirit of the invention.

What is claimed is:

1. A three-phase composite material suitable for use as an interlayer dielectric, comprising:
an organic matrix representing about 40 to 90 weight percent of said composite, wherein:
said organic matrix is formed from a composition comprising an organic-component precursor present in an amount in the range of about 40 to 90 weight percent of said composition;

said organic matrix has pores; and said pores are formed from a microporosity-imparting agent; and inorganic particles, at least some of which are coupled to said organic matrix, wherein:

the coupling is promoted by a moiety present in said composition, which moiety links said inorganic particles to said organic-component precursor or a reaction product thereof;

said inorganic particles contain a metal;

said inorganic particles are characterized by an average particle size of less than one micron;

said inorganic particles are present in an amount within a range of about 1 to about 50 weight percent of the composite material.

2. The three-phase composite material of claim 1, wherein:

said pores are present in an amount sufficient to reduce an average dielectric constant of said three-phase composite material to about 3.0 or less at one megahertz and higher frequencies; and said average dielectric constant is the average of a dielectric constant of said organic matrix, said inorganic particles and said pores.

3. The three-phase composite material of claim 1 further comprising fluorine.

4. The three-phase composite material of claim 1 further comprising molecules exhibiting a porous caged structure.

5. A composition comprising:

an organic-component precursor present in an amount in the range of about 40 to 90 weight percent of said composition;

an inorganic component present in an amount in the range of about 1 to 50 weight percent of the combined amount of organic-component precursor and inorganic component in said composition;

a moiety for linking said inorganic component with said organic-component precursor or a reaction product thereof; and a microporosity-imparting agent.

6. The composition of claim 5, wherein said moiety is a coupling agent, said coupling agent having:

an inorganic functionality for linking with said inorganic-component; and an organic functionality for linking with said organic-component precursor or a reaction product thereof.

7. The composition of claim 6, wherein said coupling agent is fluorine substituted.

8. The composition of claim 6, wherein said coupling agent comprises at least one primary amine group.

9. The composition of claim 5, wherein said moiety is an organic functionality of said inorganic component.

10. The composition of claim 5, wherein said inorganic component comprises an inorganic-component precursor.

11. The composition of claim 10, wherein said inorganic component-precursor comprises an organometallic compound.

12. The composition of claim 11, wherein said organometallic compound comprises a metal selected from the group consisting of germanium, silicon, tin, titanium and zirconium.

13. The composition of claim 11, wherein said organometallic compound is selected from the group consisting of metal alkoxides and modified-metal alkoxides.

14. The composition of claim 13, wherein said organometallic compound is a metal alkoxide selected from the group consisting of tetraethyl orthosilicate, tetramethyl orthosilicate, zirconium (IV) butoxide and zirconium (IV) propoxide.

15. The composition of claim 13, wherein said organometallic compound is a modified-metal alkoxide that includes fluorine.

16. The composition of claim 10, wherein said moiety is a coupling agent, said coupling agent having:

an inorganic finctionality for linking with said inorganic-component precursor or a reaction product thereof; and an organic functionality for linking with said organic-component precursor or a reaction product thereof.

17. The composition of claim 16, wherein said coupling agent and said inorganic-component precursor or a reaction product thereof are linked.

18. The composition of claim 16, wherein said coupling agent and said organic-component precursor are linked.

19. The composition of claim 5, wherein said organic-component precursor forms a ring-containing polymer when polymerized.

20. The composition of claim 5, wherein said microporosity imparting agent is a foaming agent.

21. The composition of claim 5, wherein said microporosity-imparting agent is a thermally-labile constituent.

22. The composition of claim 5, wherein said microporosity imparting agent comprises a molecule that exhibits a porous caged-structure.

23. The composition of claim 5, further comprising volatile gas, wherein said microporosity-imparting agent is a foaming agent and said volatile gas is formed by chemically reacting said foaming agent.

24. The composition of claim 5, further comprising a thermally-labile polymeric component, wherein said microporosity-imparting agent is a thermally-labile constituent and said thernally-labile polymeric component is formed by polymerizing said thermally-labile constituent.

* * * * *